(12) United States Patent
Martin et al.

(10) Patent No.: US 9,752,915 B2
(45) Date of Patent: Sep. 5, 2017

(54) SNAPFIT DIPSTICK ASSEMBLY

(71) Applicant: Kohler Co., Kohler, WI (US)

(72) Inventors: Tyler Martin, Sumrall, MS (US); Timothy Harreld, Hattiesburg, MS (US); Alexander Weldum, Thiensville, WI (US)

(73) Assignee: Kohler, Co., Kohler, WI (US)

( * ) Notice: Subject to any disclaimer, the term of this patent is extended or adjusted under 35 U.S.C. 154(b) by 102 days.

(21) Appl. No.: 14/581,599

(22) Filed: Dec. 23, 2014

(65) Prior Publication Data

US 2016/0178424 A1    Jun. 23, 2016

(51) Int. Cl.
G01F 23/04 (2006.01)

(52) U.S. Cl.
CPC ............ G01F 23/04 (2013.01)

(58) Field of Classification Search
CPC ........................................................ G01F 23/04
USPC .......... 33/346, 365, 366.15, 366.17, 366.18, 33/721–722, 728–732; 116/227–229, 276
See application file for complete search history.

(56) References Cited

U.S. PATENT DOCUMENTS

| 1,423,558 | A |   | 7/1922  | Gillet |              |
|-----------|---|---|---------|--------|--------------|
| 1,776,942 | A |   | 9/1930  | Deutsch |             |
| 3,319,597 | A |   | 5/1967  | Schnitzius et al. |  |
| 3,371,418 | A | * | 3/1968  | Moeller | G01F 23/04 |
|           |   |   |         |         | 215/360     |
| 3,377,708 | A |   | 4/1968  | Gassman et al. |       |
| 3,397,808 | A |   | 8/1968  | Jones |               |
| 3,434,614 | A | * | 3/1969  | Moller | B65D 41/18 |
|           |   |   |         |        | 215/224     |
| 3,474,884 | A |   | 10/1969 | Braun |               |
| 3,488,855 | A |   | 1/1970  | Howe  |               |
| 3,626,596 | A | * | 12/1971 | Manke | G01F 23/04  |
|           |   |   |         |       | 33/731      |
| 3,651,972 | A | * | 3/1972  | Itoh   | B65D 47/265 |
|           |   |   |         |        | 215/295    |
| 3,703,038 | A | * | 11/1972 | Smith  | G01F 23/045 |
|           |   |   |         |        | 15/220.4   |
| 3,722,102 | A |   | 3/1973  | Jackson et al. |       |
| 3,848,763 | A | * | 11/1974 | Kropp  | B65D 50/045 |
|           |   |   |         |        | 215/225    |
| 3,885,317 | A | * | 5/1975  | Karls  | G01F 23/04 |
|           |   |   |         |        | 33/727     |

(Continued)

FOREIGN PATENT DOCUMENTS

FR         1090791 A      4/1955
WO      WO9630728 A1   10/1996

OTHER PUBLICATIONS

European Search Report for related European Application No. 15199844.0 dated Jun. 3, 2016.

Primary Examiner — R. A. Smith
Assistant Examiner — Tania Courson
(74) Attorney, Agent, or Firm — Lempia Summerfield Katz LLC

(57) ABSTRACT

A dipstick assembly for an oil tank may include a tube with a receiving end and an outwardly projecting lip disposed near the receiving end. The assembly may also include a dipstick having a lower portion configured to be inserted into the tube, and an upper portion including a flexible arm. The flexible arm may be configured to releasably engage the outwardly projecting lip when the lower portion is inserted into the tube.

18 Claims, 7 Drawing Sheets

(56) References Cited

U.S. PATENT DOCUMENTS

| | | | |
|---|---|---|---|
| 3,934,745 A * | 1/1976 | Lovell | B65D 50/045 215/224 |
| 3,991,476 A * | 11/1976 | Haines | G01F 23/04 33/731 |
| 4,055,898 A | 11/1977 | Braun et al. | |
| 4,155,166 A * | 5/1979 | Rochow | G01F 23/04 33/727 |
| 4,190,170 A * | 2/1980 | Boyd | B65D 51/1622 215/307 |
| 4,330,940 A | 5/1982 | Leitgeb | |
| 4,368,579 A | 1/1983 | Bauer | |
| 4,761,886 A | 8/1988 | Wilson et al. | |
| 4,965,942 A | 10/1990 | Hoszowski | |
| 4,981,016 A | 1/1991 | Coleman | |
| 5,042,167 A | 8/1991 | Link | |
| 5,094,008 A | 3/1992 | Murphy et al. | |
| 5,099,584 A | 3/1992 | Williams | |
| 5,113,594 A | 5/1992 | Ishihara et al. | |
| 5,325,981 A | 7/1994 | Klomhaus et al. | |
| 5,368,178 A * | 11/1994 | Towns | B65D 55/02 215/316 |
| 5,613,303 A * | 3/1997 | Kayano | G01F 23/04 33/722 |
| 5,992,037 A | 11/1999 | Klotz | |
| 6,314,808 B1 | 11/2001 | Williams et al. | |
| 6,453,740 B1 | 9/2002 | Williams et al. | |
| 6,752,173 B2 | 6/2004 | Sundqvist | |
| 6,935,044 B2 | 8/2005 | Dougherty et al. | |
| 6,988,403 B2 | 1/2006 | Dougherty et al. | |
| 7,055,384 B2 | 6/2006 | Williams et al. | |
| 7,131,213 B2 | 11/2006 | Dougherty et al. | |
| 7,134,220 B2 | 11/2006 | Porter et al. | |
| 7,360,319 B1 * | 4/2008 | Goldstein | G01F 23/04 15/220.4 |
| 7,546,693 B1 | 6/2009 | Impellizeri | |
| 7,779,555 B2 | 8/2010 | Impellizeri | |
| 7,818,893 B2 | 10/2010 | Amiri et al. | |
| 7,979,999 B2 | 7/2011 | Goldstein et al. | |
| 8,272,140 B2 * | 9/2012 | Goldstein | G01F 23/04 33/725 |
| 2006/0086747 A1 * | 4/2006 | Dagn | F01M 11/03 220/795 |
| 2009/0095211 A1 * | 4/2009 | Johns | B01J 8/0015 116/201 |

\* cited by examiner

SNAPFIT DIPSTICK ASSEMBLY

TECHNICAL FIELD

This disclosure is generally related to a dipstick and dipstick assembly, and more particularly relates to a dipstick assembly featuring snapfit arms.

BACKGROUND OF THE INVENTION

Dipsticks may be used to measure the level of oil inside an engine. For example, the dipstick may be inserted and the removed from an oil reservoir on an engine. The amount of the dipstick covered with oil may indicate the oil level. When not in use, dipsticks are commonly positioned or secured in tubes leading to the oil reservoir of the engine.

DETAILED DESCRIPTION OF THE EMBODIMENTS

Dipsticks may be positioned and secured to a tube leading to an oil reservoir on an engine, or other structures, in various ways. Common challenges of dipstick design may include retention and stability in this tube. Some ways of meeting these challenges include either a quarter turn locking feature or the addition of another component to add clipping functionality. For example, a dipstick may be secured via a twist-on structure that secures the dipstick to a receiving end of the tube. One or more components may assist with securing the dipstick, such as tabs that interlock with the inside of the tube. These structures may intricate and thus may cost more to mold or otherwise require the assembly of multiple parts. However, without any securing structure, a dipstick may come out of its seating within the tube due to engine vibrations or external elements catching on the pull or handle of the dipstick, such as tree branches or fence wire.

Figure 1:
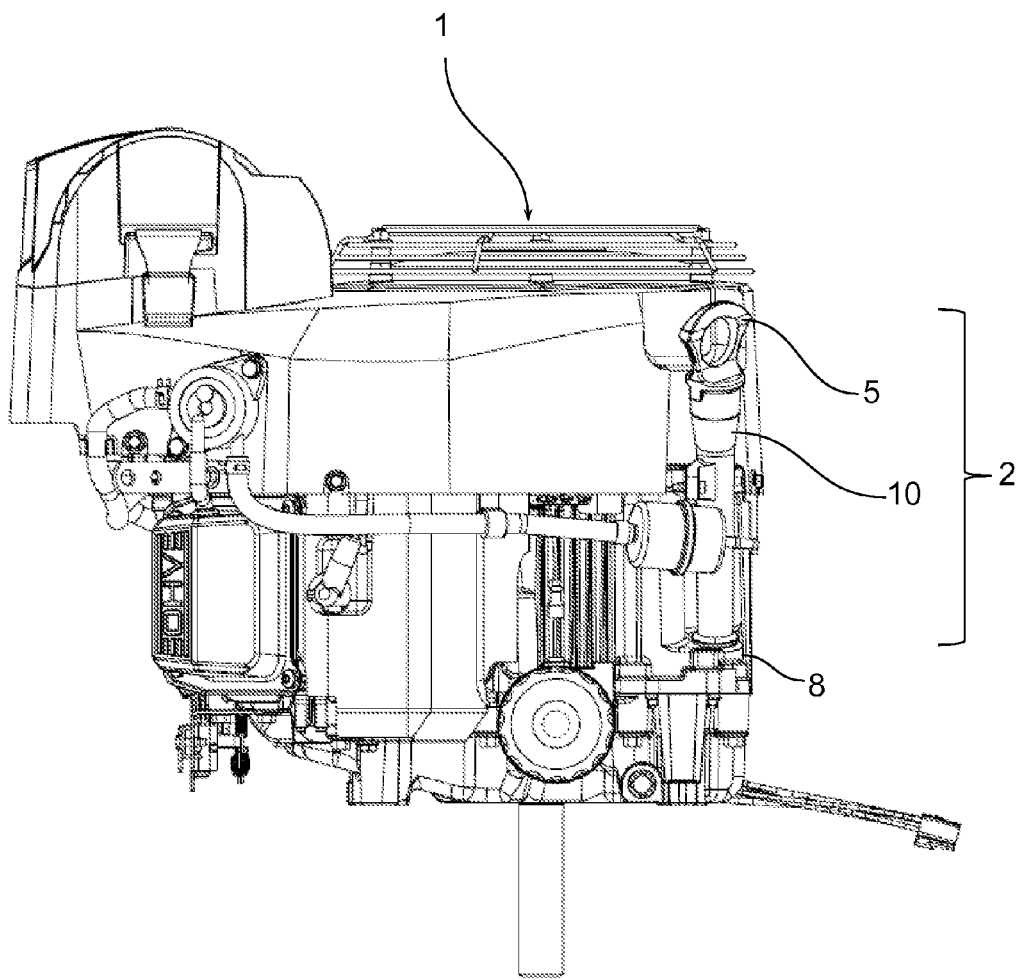
FIG. 1 shows an example of engine with a dipstick assembly.

FIG. 1 shows an example of engine 1 with a dipstick assembly 2 that provides a cost effective dipstick assembly with minimal parts and prevents unwanted or accidental removal of dipstick from tube. The dipstick assembly 2 may lend clipping functionality to the dipstick without the addition of another component. Beneficially combined with this functionality may be the geometry of the mating component (i.e., a lip, groove, chamfer, or any other pronounced feature) that interacts with the dipstick clip feature to induce a force which acts in opposition to movement in the direction of removal.

The dipstick assembly 2 may be a snapfit dipstick assembly, and may include a dipstick 5 and a tube 10. The dipstick 5 may be inserted into the tube 10 which may connect to an oil tank of the engine 1.

The dipstick assembly 2 may be positioned on an engine block 1. For example, the tube 10 may be connected to an oil reservoir 8 (such as an oil tank) of the engine 1. The tube 10 may be positioned on the engine 1 to allow for easy insertion and removal of the dipstick 5, such as near the top or edges. Consistent positioning or placement of the dipstick 5 within the tube 10 may allow for the relatively precise measurement of the oil levels within the oil reservoir of the engine 1, thus aiding a user in the filling of the oil reservoir and operation of the engine 1.

Figure 2:
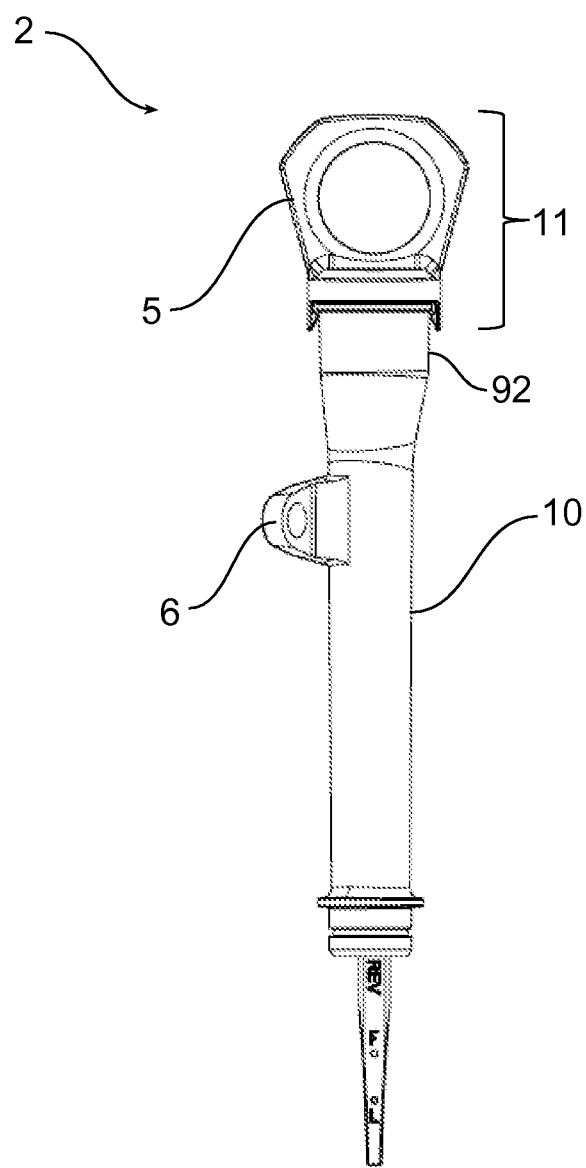
FIG. 2 shows an example of a dipstick assembly.

Alternatively, the tube 10 and/or the entire dipstick assembly 2 may be positioned in various other locations. As an example, the position of the oil tank in the particular design of the engine 1 may facilitate a different positioning of the tube 10 to allow for access to the oil reservoir. Many positions and configurations are possible. Relative to the colors, materials, and shape of the other parts of the engine 1, the tube 10 and dipstick 5 may be shaped, colored, labeled, or made of a distinctive material that may draw the attention of the user and/or alert the user that the tube 10 and the dipstick 5 are in connection with the oil tank of the engine 1. FIG. 2 shows an example of a dipstick assembly 2 in isolation from an engine 1 or oil tank.

The dipstick 5 may be integrally formed as one piece. The dipstick 5 may be made of plastic, thermoplastic, metal, or any other material suitable to resist the heat of the engine and being immersed in engine oil. The dipstick 5 may be made of a material resistant to ultraviolet (UV) radiation exposure and outdoor, weather, or other external elements, such as polytetrafluoroethylene (PTFE), low-density polyethylene (LDPE), fluorosilicone (FVMQ), ethylene acrylic (AEM), polycarbonate, a thermoplastic, or an acrylic polymer (PMMA). The dipstick 5 may be integrally formed through an injection or vacuum molding process utilizing a thermoplastic, nylon resin, or other moldable material. Integral formation of the dipstick 5 may be advantageous from a manufacturing perspective because of the lack of numerous parts requiring labor and time to assemble.

Alternatively, the dipstick 5 may be formed from multiple parts that fit together. For example, the dipstick may have an upper portion 11 (which may, for example, lie outside of the tube 10), which may be formed separate from a lower portion 12 (which may, for example, lie within the tube 10). The upper portion 11 and lower portion 12 may be later joined together by interlocking tabs, glue, friction welding, and/or any other means for joining the two portions. In some of these example dipsticks 5, the portions 11 and 12 may be made of differing materials, for example, the upper portion 11 may be plastic or rubber and the lower portion may be acrylic or metal. In others, the portions 11 and 12 may be made of the same material. The multiple portion configurations of dipsticks 5 may be advantageous, for example, if the upper portion 11 of the dipstick 5, which is configured to remain outside of the tube 10 when the dipstick 5 is fully inserted into the tube 10, may freely rotate relative to the lower portion 12 of the dipstick 5 which is positioned inside the tube 10 when the dipstick 5 is fully inserted into the tube 10. Another potential advantage to the upper portion 11 of the dipstick 5 being a separate piece from the lower portion 12, for example, is that in manufacturing various dipsticks 5 for different tubes 10 or engines 1, the upper portion 11 may be able to remain the same for all various dipsticks 5 and only the lower portion 12 style varies. Many other variations are possible.

The tube 10 may be integrally formed of plastic, rubber, steel, or any other material that may sufficiently withstand the heat and vibrations of the engine 1. Alternatively, the tube 10 may be formed of multiple pieces of the same or varying materials.

The tube 10 may be connected to the oil tank of the engine 1 through a permanent or semi-permanent attachment to the oil tank or engine 1. For example, the tube 10 may be shaped at its lower end such that it snaps fixedly into the opening of the oil tank of the engine 1. Alternatively, the tube 10 may include flanges or other pieces extending from the tube 10 such that fasteners (such as screws, glue, etc.) may be hold the flanges or extending pieces of the tube 10 to the oil tank or engine 1 in a permanent or semi-permanent fashion. In another alternative embodiment, the tube 10 may be integrally formed with and extending from the oil tank of the engine 1. The dipstick 5 may be configured to be inserted into the tube 10 such that a portion of the dipstick 5 is releasably secured within the tube 10 in order to facilitate sufficiently consistent measurement of the oil levels within the tube 10 and/or oil tank.

The tube 10 of the dipstick assembly 2 may further include a tether attachment 6. A tether 95 (see FIG. 6) may be attached to the tether attachment 6 and to the dipstick 5. The tether 95 may prevent accidental loss of the dipstick 5 and/or provide a simple locating system for the dipstick 5 should a user drop the dipstick 5.

The tether attachment 6 may be integrally formed extending from the tube 10. Alternatively, the tether attachment 6 may be permanently or semi-permanently affixed to the tube 10 and/or another location on the engine 1. The tether attachment 6 may be made of metal, plastic, or any other material sufficient to maintain its shape and resist the heat of the engine 1 and/or other external elements. The tether attachment 6 may include a hole and/or other structure suitable for attaching a tether. Alternatively, the tether attachment 6 may itself be integrally formed with a tether extending from it, and/or include a permanently or semi-permanently attached tether.

The tether attachment 6 may be positioned on the tube 10 or in another location on the engine 1. The tether attachment 6 may facilitate attachment of a tether or other clip or connection means, which may be further attached to the dipstick 5 and/or other accessories for the engine 1. Alternatively, the tether attachment 6 may be permanently connected to the dipstick 5 and/or the tube 10, for example, through an elongated plastic flexible connection.

Figure 3:
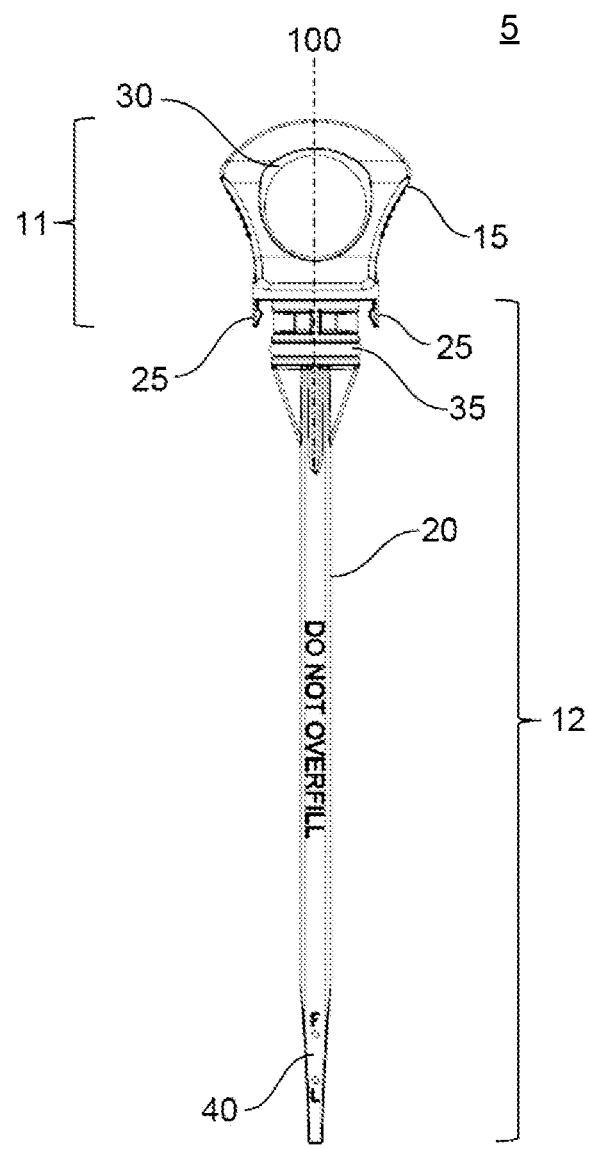
FIG. 3 shows an example of a dipstick.

FIG. 3 shows an example of a dipstick 5. The upper portion 11 of the dipstick 5 may include a handle 15 and an o-ring 35, as well as one or more arms 25 (sometimes referred to as "snapfit arms"). In some systems, the upper portion 11 may include any portion of the dipstick 5 that lies outside of the tube 10 when the dipstick 5 is inserted into the tube 10. The lower portion 12 of the dipstick 5 may include a shaft 20 and a lower end 40. In some systems, the lower portion 12 may include any portion of the dipstick 5 that lies within the tube when the dipstick 5 is inserted into the tube 10. Other variations are possible.

The handle 15 may include a grasping component 30 which may be grasped in order to easily pull the dipstick 5 out of the tube 10 or push the dipstick 5 into the tube 10. The grasping component 30 may, in some instances, be an aperture through the handle 15 sized to allow a user's finger to fit through it. The aperture may operate as an attachment point for a tether for the dipstick 5 which may be connected to the tether attachment 6 and/or another location on the engine 1 or tube 10. Instead of including a hole through the handle 15, the grasping component 30 may instead comprise some form of ergonomic shape, outdent, or indent formed into the handle 15 such that it enables the user to grip the handle 15 of the dipstick 5 and either insert the dipstick 5 into or remove the dipstick 5 from the tube 10. The handle 15 may be coated or made of a thermally insulating material such that it will help keep the handle 15 cool to the touch for the user and prevent burns.

The upper portion 11 may include some formation, groove, or flange configured to keep the o-ring 35 permanently or semi-permanently in a fixed position on the dipstick 5 once the o-ring 35 is stretched over the formation or flange. The o-ring 35 may be positioned near the handle 15, such as by inserting the o-ring 35 over the lower end 40 and shaft 20 of the dipstick 5 and securing the o-ring 35 in the formation near the handle 15. Alternatively, the o-ring 35 may be glued or otherwise affixed in one position on the shaft 20 of the dipstick 5. The o-ring may be positioned around the lower portion of the dipstick 5 and engage an interior surface 120 of the tube (see FIG. 5) when the lower portion 12 of the dipstick 5 is inserted into the tube 10. The o-ring 35 may provide a seal between the dipstick 5 and the tube 10 when the dipstick 5 is inserted into the tube 10. This may help prevent both escape of oil or vapors from the oil tank and the entry of unwanted external liquids, vapors, or particulate matter into the oil tank through the tube 10. Additionally or alternatively, the o-ring 35 may provide a friction barrier between the shaft 20 of the dipstick 5 and the inside of the tube 10 in order to help prevent accidental removal of the dipstick 5 from the tube 10. The o-ring 35 may be made of rubber, plastic, or any other malleable material sufficient to withstand the heat of the engine 1 and exposure to oil.

The shaft 20 and/or the lower end 40 may include marks or words indicating warnings or designating measurement guides to the user. Additionally or alternatively, the shaft 20 and/or lower end 40 may include formations within the dipstick 5 material shaped to be indications of measurement guides. These measurement guides on the dipstick 5 may be individually tailored to the particular combination of dipstick 5, tube 10, oil tank, oil, and/or engine 1, such that they indicate an appropriate engine oil fill line for the particular engine when used with the dipstick 5. The warnings and measurement guides may be integrally formed with the shaft 20, may be indentations formed integrally with or later removed from the shaft 20, or may be additional components added to the shaft 20 at later times. Many other variations are possible.

Figure 4:
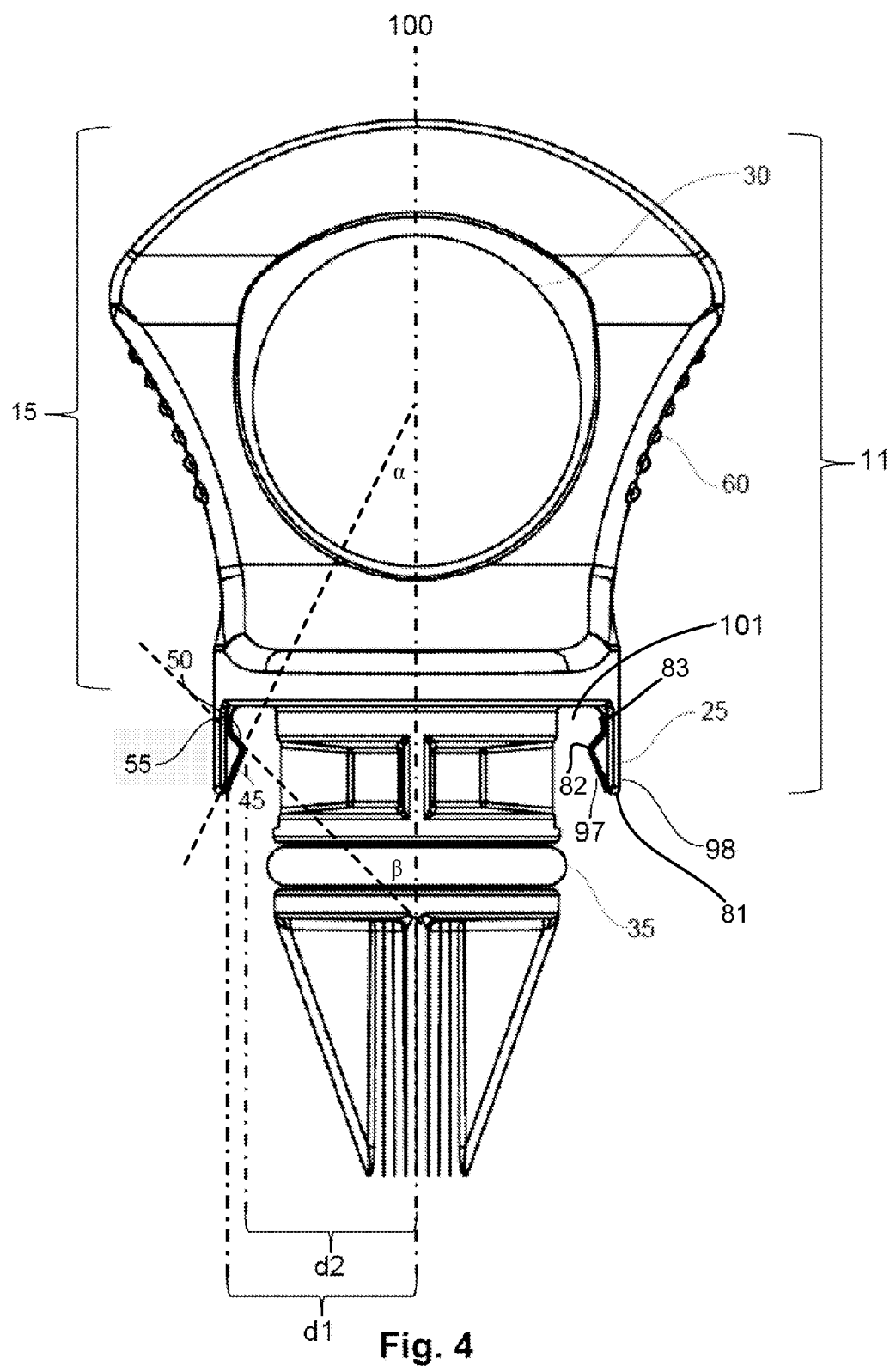
FIG. 4 shows an example of an upper portion of a dipstick.

FIG. 4 shows an example of an upper portion 11 of a dipstick 5 which includes arms 25, a grasping component 30 and/or grips 60.

The arms 25 may include an inner surface 97, which may face an exterior surface of the tube 10 when the dipstick 5 is inserted into the tube 10. The arms 25 may also include an outer surface 98 opposite the inner surface, and facing away from the exterior surface of the tube 10 when the dipstick 5 is inserted into the tube 10.

The arms 25 may include a lower tab surface 45, an upper tab surface 50, and/or an arm bridge 55. The lower tab surface 45 may be a portion of the inner surface of the arm 25, at or near the lower end of the arm 25. The lower tab surface 45 may generally face away from the handle 15 and/or toward an end of the shaft 20 opposite the handle 15 and/or lower end 40. The distance $d1$ between a point 81 (also referred to as a tip end of the arm 25) of the lower tab surface 45 closest to the lower end 40 (or farthest from the grasping component 30) and a central axis 100 of the dipstick 5 may be greater than the distance $d2$ between a point 82 of the lower tab surface 45 (or the junction between the lower tab surface 45 and the upper tab surface 50) farthest from the lower end 40 (or closest to the grasping component 30) and the central axis 100 of the dipstick 5. The thickness of the arm 25 at the point 81 of the lower tab surface 45 closest to the lower end 40 (or farthest from the grasping component 30), as measured between the inner surface and the outer surface of the arm 25 perpendicularly from the central axis 100, may be less than the thickness of the arm 25 at the point 82 of the lower tab surface 45 farthest from the lower end 40 (or closest to the grasping component 30). The lower tab surface 45 may generally form an acute angle α relative to the central axis 100, angling outward or away from the central axis relative to the grasping component 30. In some systems, the acute angle formed by the lower tab surface 45 and the central axis 100 may be, for example, between 20 and 40 degrees, though other angles are possible. The lower tab surface 45 may be a smooth and/or inclined surface, providing a guide for the insertion of the dipstick 5 into the tube 10 such that the arms 25 extend outside of the tube 10.

The upper tab surface 50 may also be a portion of the inner surface of the arm 25, and may be positioned adjacent the lower tab surface 45. The upper tab surface 50 may additionally be positioned below the arm bridge 55. The upper tab surface 50 may generally face toward the handle 15 and/or toward an end of the shaft 20 near or adjacent the handle 15. The distance between a point 82 of the upper tab surface 50 closest to the lower end 40 (or farthest from the grasping component 30) and a central axis 100 of the dipstick 5 may be less than the distance between a point 83 of the upper tab surface 50 farthest from the lower end 40 (or closest to the grasping component 30) and the central axis of the dipstick 5. The thickness of the arm 25 at the point 82 of the lower tab surface 50 closest to the lower end 40 (or farthest from the grasping component 30), as measured between the inner surface and the outer surface of the arm 25 perpendicularly from the central axis 100, may be greater than the thickness of the arm 25 at the point 83 of the upper tab surface 50 farthest from the lower end 40 (or closest to the grasping component 30). The upper tab surface 50 may generally form an acute angle β relative to the central axis 100, angling inward or toward from the central axis 100 relative to the grasping component 30. In some systems, the acute angle formed by the upper tab surface 50 and the central axis may be, for example, between 20 and 40 degrees, though other angles are possible. The upper tab surface 50 may be a smooth and/or inclined surface, providing a recess for the secure placement of the lip 65 of the tube 10 when the dipstick 5 is inserted within the tube 10.

The lower tab surface 45 and the upper tab surface 50 may form an angle at their junction which may be adjusted to optimize the arm 25 interaction with the tube 10. In some systems, the angle formed by the lower tab surface 45 and the upper tab surface 50 may be, for example, between 100 and 140 degrees, though other angles are possible. The lower tab surface 45 and upper tab surface 50 may intersect at a point, or may have a rounded or non-linear contiguous contour which may not form a distinct angle between the two at the junction. In some embodiments, for example, the arm 25 may include multiple protrusions or tabs on its inner surface which may result in the upper tab surface 50 not being directly adjacent to the lower tab surface 45, but instead being interrupted by a curvy shape or multiple ridges disposed between the two. Many variations are possible.

The upper tab surface 50 and lower tab surface 45 may in combination may form a tab, protrusion, or outdent disposed near the end of the arm 25 closest to the lower end 40 of the dipstick 5 (or farthest from the grasping component 30). The arm bridge 55 may connect the handle 15 to the upper tab surface 50 and/or lower tab surface 45. The arm bridge 55 may form an indentation on the inner surface of the arm 25 above the upper tab surface 50 toward the handle 15 of the dipstick 5. Alternatively or additionally, the combination of the upper tab surface 50 and the lower tab surface 45 may be in the shape of an outdent, tab, or protrusion relative to the arm bridge 55 on the inner surface of the arm 25 facing toward the shaft 20. The distance between the arm bridge 55 and the central axis of the dipstick 5 may be greater than the distance between any point of the upper tab surface 50 and the central axis of the dipstick 5. The thickness of the arm 25 at the arm bridge 55, as measured between the inner surface and the outer surface of the arm 25 perpendicularly from the central axis, may be less than the thickness of the arm 25 at any point of the upper tab surface 50.

The lower tab surface 45 and upper tab surface 50 may be integrally formed on the arm 25. Alternatively, the lower tab surface 45 and upper tab surface 50 may be part of or makeup a protrusion or add-on component that is permanently or semi-permanently affixed to the inner surface of the arm 25 through gluing, friction welding, or any other means sufficient to position the lower tab surface 45 and upper tab surface 50 on the arm 25 such that they are resistant to the force of the tube 10 and other external elements.

The tab of the arm 25 may impede the outwardly projecting lip from moving past the tab without an outside force being applied to either the projecting lip or the tab for releasably securing the dipstick in the tube.

The arm 25 may prevent the dipstick 5 from being accidentally pulled out or being jogged loose from the tube 10 by engine vibrations. Multiple arms 25 may be positioned around the tube 10. The arms 25 may be few in number to allow for cheaper and easier formation or molding of the dipstick 5 as one integral piece. In an example embodiment, the dipstick 5 may include three or four arms 25 which may be positioned at equal intervals around the perimeter of the dipstick 5 to fit around the tube 10, which may impede lateral motion of the dipstick 5 relative to the tube 10 when fully inserted. Any number of arms 25, spaced equal distance or at different distances from each other, are possible.

In other systems, rather than have separate arms 25 and a lip 65 extending along most or all of the circumference of the tube 10, the dipstick 5 may have one circular arm 25 extending downward along the entire base of the handle 15. In some of these systems, the tube 10 may have a number of partial lips 65 along the opening of the tube 10 for engaging the circular arm 25. For example, the tube 10 may have four partial lips 65, each acting like a tab or projection, along the opening of the tube 10, which may engage the circular arm 25. The insertion of the dipstick 5 into the tube 10 may be performed similar to what is described herein. Many other variations are possible.

The grips 60 may be positioned anywhere on the handle 15 and/or on the grasping component 30. The grips 60 may comprise a plurality of indents and/or outdents in the shape or any combination of lines, circles, or any other shape or pattern so that the grips 60 may provide a more frictioned or ergonomic area for the user to grip. The handle 15 of the dipstick 5 may include any other form of ergonometric, ergonomic, or tactile formations. Further, the handle 15 may even include a fingerprint scanner (not shown) or other security features in conjunction with a locking mechanism allowing the user to limit access to the oil tank. The grips 60 may be integrally formed or molded with the dipstick 5, or may be separate protrusions added to the dipstick 5 at a later time. Many other variations are possible.

Figure 5:
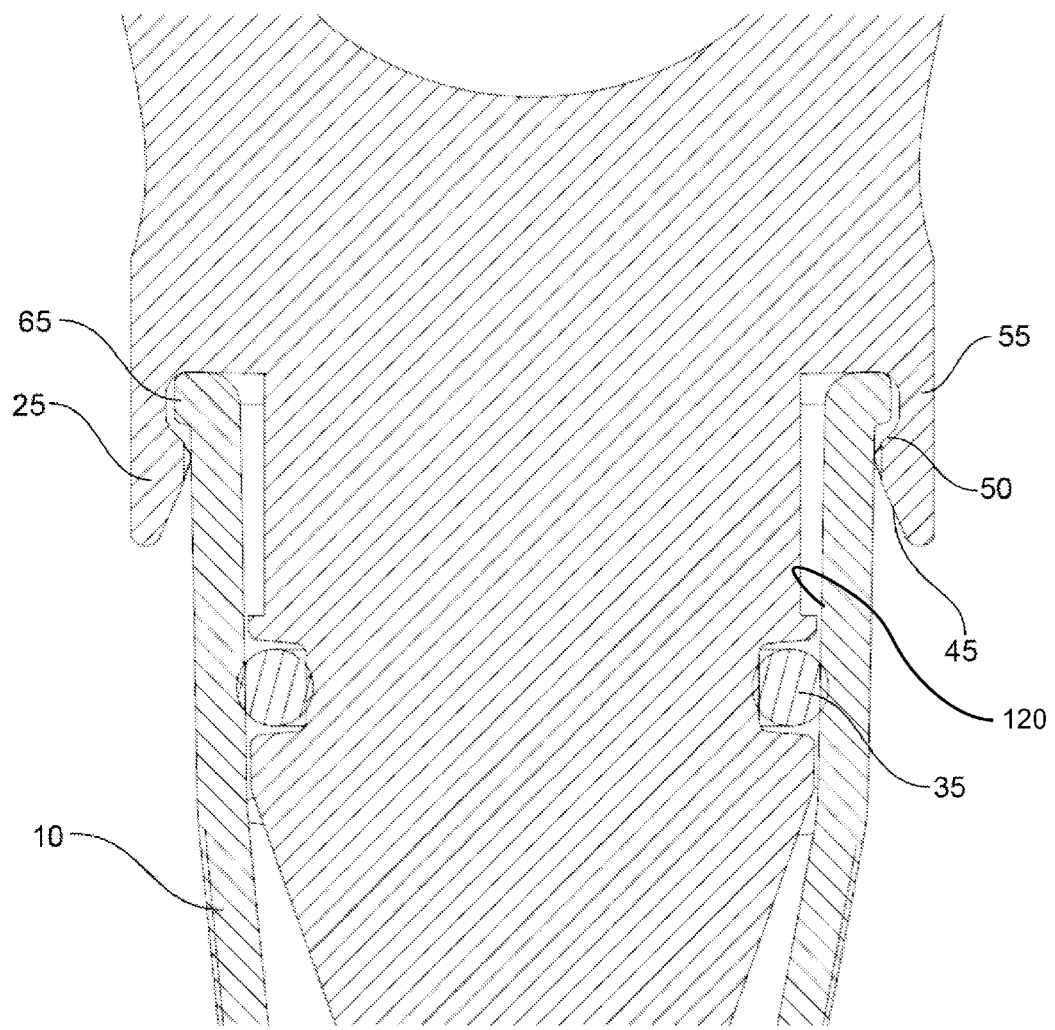
FIG. 5 shows an example of a dipstick assembly where the dipstick meets the tube.

FIG. 5 shows a cross-sectional view of an example of a dipstick assembly 2 with the dipstick 5 inserted into the tube 10. The tube 10 may include a lip 65 that extends or projects outwardly (away from a center of the tube 10) around an opening on one end of the tube 10. The outwardly projecting lip 65 may have a circular cross-section, or may take on various other shapes. In some systems, the lip 65 may have a rounded appearance, facilitating a smooth and continuous interaction with the upper and lower tab surfaces during insertion. One or both of the lip 65 and the arms 25 may be sized to facilitate the engagement of the lip 65 with the contour of the arm 25 formed by or near the arm bridge 55. The low number of parts for the dipstick assembly may be advantageous in time and labor savings. The dipstick 5 and the o-ring 35 may be cost-effectively manufactured and quickly assembled by removing the dipstick 5 from its mold and the applying of an o-ring 35.

The lip 65 may be positioned near the open end of the tube 10 where the dipstick 5 is inserted. The lip 65 may, in some systems, extend around the entire external perimeter of the tube 10. This configuration may be advantageous, for example, if the dipstick 5 may be inserted into the tube 10 in substantially any rotational orientation relative to the tube 10 when the lower end 40 and/or shaft 20 are inserted.

Alternatively, the lip 65 may include an indentation or interruption in its circuit around the tube 10. In some of these systems, the indentation or interruption may be sized such that a width of an arm 25, or portion of the arm 25, of the dipstick 5 may fit within the indentation or interruption. In some of these systems, the dipstick 5 may be turned, after inserted, such that the lip 65 is slid within the area of the dipstick 5 adjacent the arm bridge 55. In other variations, the indentation or interruption may be smaller than a width of the arm 25.

In another alternative, the lip 65 may comprise one or more segments of protrusion around the tube 10. This configuration may be advantageous, for example, if the shape of the tube 10 only allows for the insertion of the dipstick 5 in one or two orientations, such as an elliptical or rectangular tube 10. In such an embodiment, the lip 65 may only need to be in the one or two locations that the arm 25 will be oriented in relative to the tube 10.

The lip 65 may be formed integrally with the tube 10. Alternatively, the lip 65 may be permanently or semi-permanently affixed to a pre-existing tube 10 by glue or other means sufficient to maintain the position of the lip 65 in relation to the tube 10 and the dipstick 5 and/or arm 25. The lip 65 may be made of metal, plastic, or any other material sufficient to maintain its shape and resist the heat of the engine 1 and/or other external elements. The lip 65 may be shaped in any curvature sufficient to fit within the contour of the space created between the handle 15, the arm bridge 55, the upper tab surface 50, and the tube 10. The shape and size of the lip 65 may be optimized along with the relative positions and shapes of the arm bridge 55, upper tab surface 50, and/or lower tab surface 45, such that their interaction provides a particular feel, pull force threshold, push force threshold, sound, friction, and/or any combination of such. For example, a combination may be a multi-step resistance sliding action which may cue the user to the feedback of two small smooth bumps and a final loud click or snap that indicates that the dipstick 5 is fully inserted into the tube 10. The tube 10 may be easier and more cost-effective to manufacture thank more intricate threading or other interlocking structures, as the geometry of the tube 10 may include a single lip 65 at its receiving end 92 that may hold, or be secured by, the arm 25, thus securing the dipstick 5 in place in the tube 10.

The arm bridge 55 may act as an interlocking or engaging structure with the lip 65 of the tube due to the shape of the arm bridge 55. The shape of the arm bridge 55 may be an indentation above the upper tab surface 50 of the arm 25 on the inner surface of the arm 25 facing toward the tube 10.

The indentation and shape of the arm bridge 55 in relation to the upper tab surface 50 and lower tab surface 45 (sometimes referred to as the lip-receiving cavity") may be designed to engage and/or snugly fit the lip 65 of the tube 10 such that the arm 25 is in a relaxed state, that is, not deformed, and the lip 65 acts as a barrier to the upper tab surface 50, thus impeding removal of the dipstick 5 from the tube 10. Alternatively, the shape of the arm bridge 55 may not be characterized as an indentation, but rather the combination of the upper tab surface 50 and lower tab surface 45 may be characterized as having the shape of an outdent, tab, or protrusion on the inner surface of the arm 25. In this case, the function of the upper tab surface 50 as a barrier to the lip 65, or vice versa, may operate in the same or similar manner in that the interference of the lip 65 and upper tab surface 50 aids in preventing removal of the dipstick 5 from the tube 10 up to a certain force threshold.

The user may implement a method of engaging the arm 25 with the lip 65 by inserting the shaft 20 of the dipstick 5 into the tube 10 of the oil tank until the lower tab surface 45 engages the lip 65 of the tube. The user may push the dipstick 5 further into the tube 10, until the lip 65 at the upper receiving end of the tube 10 slides past the protrusion between, or formed by, the lower tab surface 45 and the upper tab surface 50. During this pushing, the lip 65 urges the arm 25 away from the shaft 20. The arm 25 is flexible and moves away from the shaft 20 as the dipstick 5 is pushed during this step. Once the lip passes the protrusion between or formed by the lower tab surface 45 and the upper tab surface 50, the forces exerted at the arm 25 act to push the arms 25 back to their stationary positions. The arm 25 snaps back into place once the upper tab surface 50 has been pushed below the lip 65. The return forces on the arm 25, as well as any additional pushing by the user, act to ensure the shaft 20 is fully inserted into the tube 10. Once inserted, the arm 25 may be returned to a stationary, non-deformed (or minimally deformed) position, and the position of the upper tab surface 50 relative to the lip 65 provides a barrier to removal of the dipstick 5 from the tube 10, thereby releasably securing the dipstick 5 in the tube 10.

The arm 25 may be made of plastic, rubber, metal, or any other material that may be sufficiently resilient and flexible to accommodate the outward bending force exerted by the lip 65 on the lower tab surface 45, upper tab surface 50, and/or arm bridge 55 during insertion of the dipstick 5 and still return substantially to the original position of the arm 25 relative to the handle 15 and/or the rest of the dipstick 5. The material of the arm 25 may further be able to withstand this force and return to its original shape through many repetitions of the outward bending force over time. For example, for over 1500 pulls of the dipstick 5 from the tube 10, the arm 25 may not show degradation in its rigidness or flexibility, but rather may maintain the optimal force threshold that may be necessary for the removal of the dipstick 5 from the tube 10.

Additionally, the arm 25 may be made of a composition that may rapidly return to its original position relative the dipstick 5, that is, "snap back" into place, in mild or extreme weather conditions. For example, the dipstick 5 and tube 10 may be disposed on an engine 1 of a snowblower or generator for use in the arctic, in which case the material of the arm 25 may maintain its resilient or elastic property even in temperatures as low as −136° F. (−94° C.), such as polytetrafluoroethylene (PTFE) or low-density polyethylene (LDPE). As another example, the dipstick 5 and tube 10 may be used on an engine 1 with high heat in hot conditions, so the material of the arm 25 may be resistant to and maintain its properties in temperatures up to 250° F. (121° C.), such as fluorosilicone (FVMQ) or ethylene acrylic (AEM). The dipstick 5 may also be exposed to ultraviolet (UV) radiation from the sun, so the arm 25 material may be UV resistant, such as polycarbonate or an acrylic polymer (PMMA).

Alternatively, instead of the dipstick 5 having a flexible arm 25, the arm 25 of the dipstick 5 may be made of a fairly rigid material and the tube 10 and/or lip 65 may be flexible such that the tube 10 and/or lip 65 deforms inward when the dipstick 5 is inserted into the tube 10 and the lower tab surface 45 and upper tab surface 50 of the arm 25 is forced over the lip 65 of the tube 10. In this case, the lip 65 or tube 10 may be made of any of the materials described above for the arm 25. As another alternative example, both the arm 25 and the tube 10 and/or lip 65 may be flexible and resilient, such that both the arm 25 and the lip 65 and/or tube 10 flex away from each other during the insertion of the dipstick 5 fully into the tube 10. Various other combinations are possible.

In terms of user experience, the interaction between the arm 25 on the dipstick 5 and the lip 65 on the tube 10 may allow a user to quickly check oil levels with a single smooth pulling motion and then immediately return the dipstick 5 to its secured position in the tube 10 by simply pushing it back in. This may simplify the process of checking or filling the oil tank for the user by eliminating any need for a twisting motion or other additional steps in accessing the oil tank. Further, the arm 25 may provide the user with instant audio and tactile feedback through the locking action of the arm 25 over the lip 65 of the tube 10. This feedback may signal the user that the task is done and/or assure the user that dipstick 5 is properly secured in its tube 10.

Figure 6:
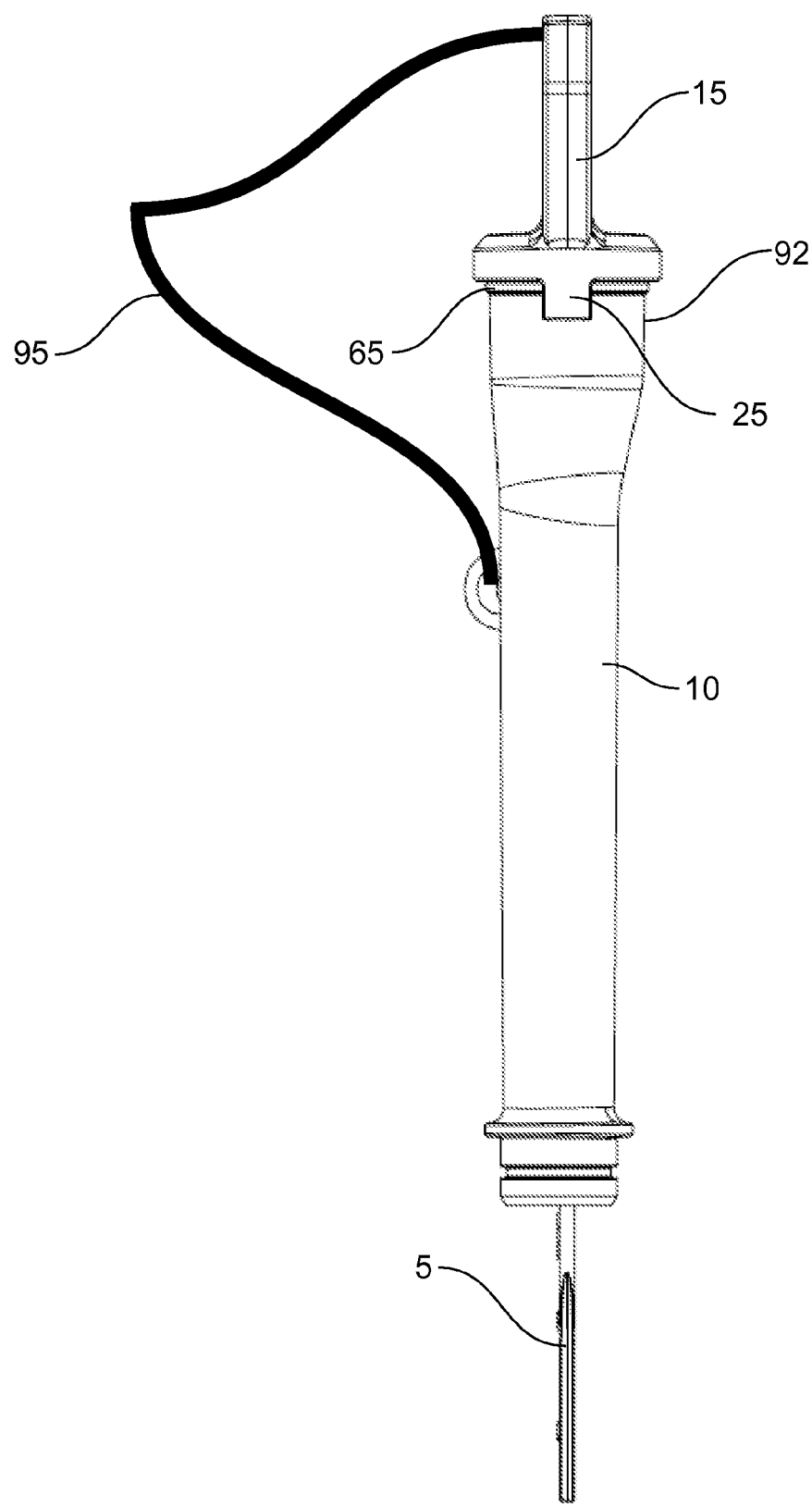
FIG. 6 shows an example of a dipstick assembly viewed from the side.

FIG. 6 shows an example of a dipstick assembly viewed from the side. The handle 15 may be generally flat at its upper portion and extend out into a circular shape that covers the opening of the tube 10 at its receiving end when the dipstick 5 is fully inserted into the tube 10 as shown, for example. Alternatively, the handle 15 may be substantially flat along with the rest of the dipstick 5. In another alternative, the handle 15 may be any type of bulbous or rounded shape in contrast with a flat shaft 20 of the dipstick 5. In yet another alternative, both the handle 15 and the shaft 20 may be substantially rounded or cylindrically shaped or any other combination of shapes. The portion of the handle 15 that may sit right above the tube 10 when the dipstick 5 is fully inserted may be shaped such that it covers or blocks the opening of the tube 10 at its receiving end. This configuration may be advantageous, for example, in helping prevent both escape of oil or vapors from the oil tank and the entry of unwanted external liquids, vapors, or particulate matter into the oil tank through the tube 10. Further, the junction of the handle 15 with the edge of the receiving end of the tube 10 may operate as a seal. This seal configuration may be used in conjunction or as an alternative to the o-ring 35 on or above the shaft 20 of the dipstick 5 inside the tube 10.

In some systems, a base of the handle 15 of the dipstick 5 and the opening of the tube 10 are circular. In some of these systems, the shape of the base of the handle 15 and of the opening of the tube 10 may facilitate inserting the dipstick 5 into the tube 10 in any rotational position. In other systems, the base of the handle 15 of the dipstick 5 and the opening of the tube 10 may be other shapes, such as elliptical, triangular, square, rectangular, or other shapes. In some of these systems, the shape of the base of the handle 15 and of the opening of the tube 10 may facilitate only certain insertion positions for the dipstick 5 into the tube 10. For example, where the base of the handle 15 and the opening of the tube 10 are elliptical, the dipstick may only be inserted in two positions 180 degrees apart from each other. In still other systems, the base of the handle 15 and the opening of the tube 10 may be other shapes and/or different shapes from each other.

Figure 7:
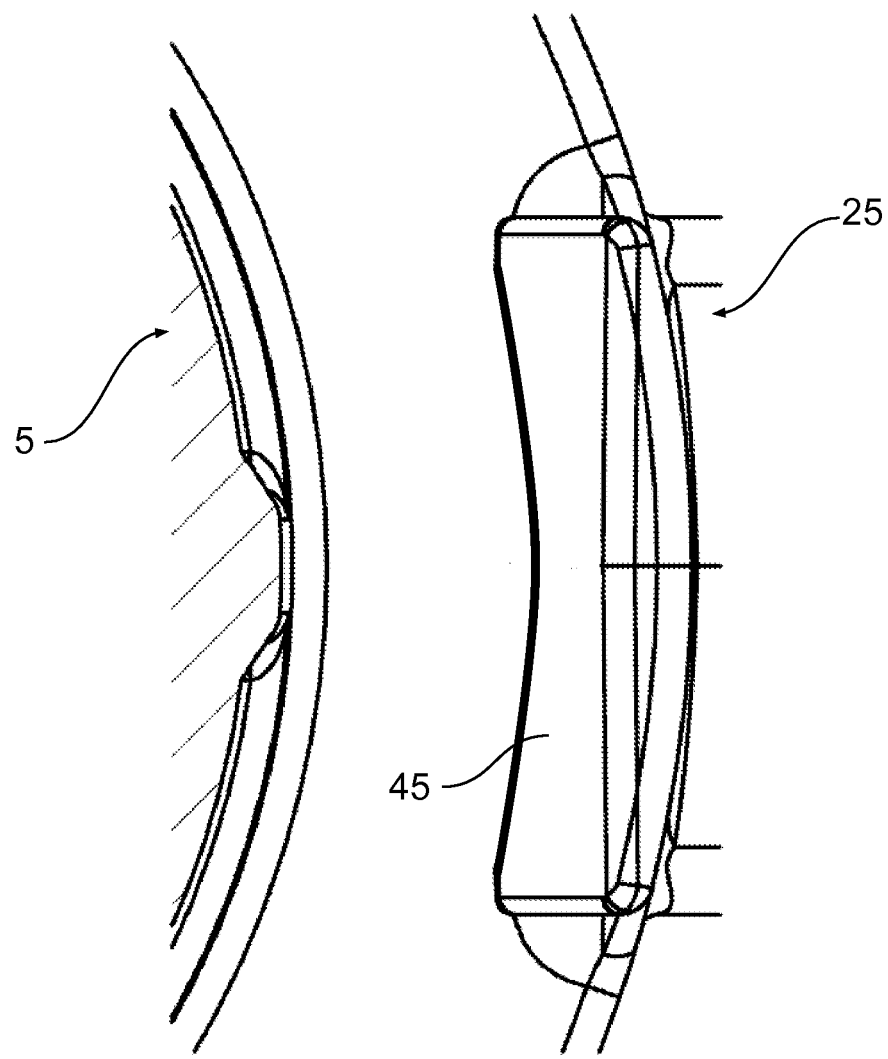
FIG. 7 shows an underside view of an example of a dipstick.

FIG. 7 shows an underside view of an example of a dipstick, particularly the view up the shaft 20 showing the center of the underside of the handle 15 to the left and the underside of the arm 25 showing the lower tab surface 45 on the right. The arm 25 may be shaped such that it generally follows the curved contour of the circumference of the lip 65 and tube 10. For example, as seen in FIG. 7, the inner surface of the arm 25 along the junction of lower tab surface 45 and upper tab surface 50 is curved to follow the circular curvature of the outside of the tube 10 when the dipstick 5 is fully inserted into the tube 10.

The methods described may include determinations in relation to one or more thresholds. While these methods may refer to a determination about whether a parameter exceeds a threshold, the determination may in other variations be whether the parameter is greater than or equal to, less than, equal to, or less than or equal to a threshold. Other variations are possible.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A dipstick assembly for an oil tank comprising:
    a tube including:
        a receiving end, and
        an outwardly projecting lip disposed near the receiving end; and
    a dipstick including:
        a lower portion configured to be inserted into the tube,
        an upper portion including a flexible arm;
        wherein the flexible arm is configured to releasably engage the outwardly projecting lip when the lower portion is inserted into the tube; and
        an o-ring positioned around the lower portion of the dipstick, the o-ring configured to engage an interior surface of the tube when the lower portion is inserted into the tube.

2. The dipstick assembly of claim 1, wherein the flexible arm includes a tab configured to impede the outwardly projecting lip from moving past the tab without an outside force being applied to either the projecting lip or the tab for releasably securing the dipstick in the tube.

3. The dipstick assembly of claim 2, wherein the tab includes a wedge-shaped protrusion; and
    wherein the flexible arm flexes outwardly when the wedge-shaped tab slides over the outwardly projecting lip and returns to a non-deformed position adjacent an exterior surface of the tube once the lower portion is fully inserted into the tube.

4. The dipstick assembly of claim 1, wherein the upper portion of the dipstick includes a plurality of flexible arms.

5. A dipstick assembly for an engine comprising:
a tube including an open end with an outwardly extending lip around the tube near the open end;
a dipstick including:
a shaft configured to be removably inserted into the tube in a direction, and
a handle above and extending from the shaft including an arm with an outer surface generally parallel to the shaft;
wherein the arm includes a tab configured to engage the outwardly extending lip when the shaft is inserted into the tube,
wherein the handle includes an o-ring configured to create a seal by engaging the interior surface of the open end of the tube spaced from the arm in the direction that the shaft is inserted in the tube when the shaft is inserted into the tube.

6. The dipstick assembly of claim 5, wherein the tab of the arm is generally wedge-shaped.

7. The dipstick assembly of claim 5, wherein the handle includes a plurality of arms.

8. The dipstick assembly of claim 7, wherein the arms are arranged substantially evenly around the handle.

9. The dipstick assembly of claim 5, wherein the arm flexes away from the shaft when the tab slides over the outwardly extending lip.

10. The dipstick assembly of claim 5, wherein the outwardly extending lip flexes toward the shaft when the tab slides over the outwardly extending lip.

11. The dipstick assembly of claim 5, wherein the tube flexes toward the shaft when the tab slides over the outwardly extending lip.

12. The dipstick assembly of claim 5, further comprising a seal positioned around the shaft of the dipstick.

13. A dipstick comprising:
a shaft having a first end configured to be inserted into an oil reservoir tube;
a handle including an aperture as a grasping component, the handle disposed on a second end opposite the first end of the shaft;
a plurality of arms extending from the handle, the arms configured to snap around an exterior lip of the tube when the shaft is inserted into the oil reservoir tube in a direction; and
an o-ring spaced apart from the plurality of arms in the direction that the shaft is inserted into the oil reservoir tube and configured to engage an interior surface of the tube when the shaft is inserted into the oil reservoir tube.

14. The dipstick of claim 13, where the handle further comprises a rounded bottom surface.

15. The dipstick of claim 14, where the arms are substantially evenly positioned around a circumference of the rounded bottom surface.

16. The dipstick of claim 14, where each of the arms comprise:
an arm bridge position extending from the rounded bottom surface;
a tip end positioned away from the rounded bottom surface; and
a central portion connecting the arm bridge and the tip end, the central portion including an inner surface generally facing the shaft of the dipstick, and a tab extending from the inner surface toward the shaft.

17. The dipstick of claim 16, where the protrusion comprises:
an upper tab surface facing the rounded bottom surface, where the upper tab surface, the arm bridge, and the rounded bottom surface form a lip-receiving cavity configured to receive the lip and lock around the exterior of the tube when the shaft is inserted into the tube; and
a lower tab surface adjacent the upper tab surface and facing away from the rounded bottom surface, the lower tab surface configured to slide along the lip when the shaft is inserted into the tube until the lip-receiving cavity locks the dipstick into place.

18. The dipstick of claim 16, where the arm bridge includes an interior surface positioned generally parallel to, and facing, the shaft; and
where the upper tab surface forms a first angle with the interior surface between 90 and 180 degrees.

\* \* \* \* \*